(12) United States Patent
Adkisson et al.

(10) Patent No.: US 7,524,694 B2
(45) Date of Patent: Apr. 28, 2009

(54) FUNNELED LIGHT PIPE FOR PIXEL SENSORS

(75) Inventors: James William Adkisson, Jericho, VT (US); Jeffrey Peter Gambino, Westford, VT (US); Robert Kenneth Leidy, Burlington, VT (US); Richard John Rassel, Colchester, VT (US)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 11/275,171

(22) Filed: Dec. 16, 2005

(65) Prior Publication Data

US 2006/0071157 A1 Apr. 6, 2006
US 2007/0138380 A1 Jun. 21, 2007

(51) Int. Cl.
*G02B 27/10* (2006.01)

(52) U.S. Cl. .................. 438/57; 438/128; 438/66; 359/619; 359/621; 359/622

(58) Field of Classification Search ............... 438/57, 438/66, 128; 359/619, 621, 622
See application file for complete search history.

(56) References Cited

U.S. PATENT DOCUMENTS

| | | | | |
|---|---|---|---|---|
| 3,110,816 A | * | 11/1963 | Kaisler et al. | 250/227.11 |
| 3,727,057 A | | 4/1973 | Higby et al. | |
| 4,495,220 A | * | 1/1985 | Wolf et al. | 438/623 |
| 5,352,886 A | * | 10/1994 | Kane | 250/216 |
| 6,069,350 A | * | 5/2000 | Ohtsuka et al. | 250/208.1 |
| 6,717,228 B2 | * | 4/2004 | Ando et al. | 257/443 |
| 6,826,320 B2 | | 11/2004 | Deliwala | |
| 2002/0081760 A1 | * | 6/2002 | Whatmore | 438/25 |
| 2003/0122209 A1 | | 7/2003 | Uya | |
| 2004/0180461 A1 | * | 9/2004 | Yaung et al. | 438/48 |
| 2004/0251395 A1 | * | 12/2004 | Takahashi et al. | 250/208.1 |
| 2005/0190453 A1 | * | 9/2005 | Dobashi | 359/619 |
| 2005/0236553 A1 | * | 10/2005 | Noto et al. | 250/208.1 |
| 2006/0189024 A1 | * | 8/2006 | Kao et al. | 438/69 |
| 2007/0187787 A1 | * | 8/2007 | Ackerson et al. | 257/428 |
| 2007/0200054 A1 | * | 8/2007 | Reznik et al. | 250/208.1 |

OTHER PUBLICATIONS

Hsu, et al.; Light Guide for Pixel Crosstalk Improvement in Deep Submicron CMOS Image Sensor; IEEE Electron Device Letters, vol. 25, No. 1; Jan. 2004; pp. 22-24; 0741-3106/04.

* cited by examiner

*Primary Examiner*—Michael B Shingleton
(74) *Attorney, Agent, or Firm*—Schmeiser, Olsen & Watts; Anthony J. Canale

(57) ABSTRACT

A photo sensing structure and methods for forming the same. The structure includes (a) a semiconductor substrate and (b) a photo collection region on the semiconductor substrate. The structure also includes a funneled light pipe on top of the photo collection region. The funneled light pipe includes (i) a bottom cylindrical portion on top of the photo collection region of the photo collection region, and (ii) a funneled portion which has a tapered shape and is on top and in direct physical contact with the bottom cylindrical portion. The structure further includes a color filter region on top of the funneled light pipe.

3 Claims, 7 Drawing Sheets

Fill the light pipes

FUNNELED LIGHT PIPE FOR PIXEL SENSORS

BACKGROUND OF THE INVENTION

1. Technical Field

The present invention relates to pixel sensors, and more specifically, to pixel sensors that have funneled light pipes.

2. Related Art

Some advanced pixel sensors implement vertical light pipes with micro-lenses, wherein the micro-lenses are used to focus light into the light pipes. Therefore, there is a need for a pixel sensor structure that does not have the micro-lenses of the prior art.

SUMMARY OF THE INVENTION

The present invention provides a pixel sensor structure, comprising (a) a semiconductor substrate; (b) a photo collection region on the semiconductor substrate; and (c) a funneled light pipe on top of the photo collection region, wherein the funneled light pipe comprises (i) a bottom cylindrical portion on top of the photo collection region of the photo collection region, and (ii) a funneled portion which has a tapered shape and is on top and in direct physical contact with the bottom cylindrical portion.

The present invention also provides a semiconductor structure fabrication method, comprising providing a structure that includes (i) a semiconductor substrate, (ii) a photo collection region on the semiconductor substrate, and (iii) a BEOL (Back End Of Line) layer on the photo collection region and the semiconductor substrate; etching the BEOL layer so as to form a funneled cavity in the BEOL layer, wherein a cross-section of the funneled cavity has a tapered shape; after said etching the BEOL layer so as to form the funneled cavity in the BEOL layer, further etching the BEOL layer through the funneled cavity so as to form a cylindrical cavity in the BEOL layer, wherein the cylindrical cavity are directly above the photo collection region and directly beneath the funneled cavity; and forming a funneled light pipe in the cylindrical cavity and the funneled cavity.

The present invention also provides a photo sensing structure, comprising (a) a semiconductor substrate; (b) a photo collection region on the semiconductor substrate; (c) a BEOL (Back End Of Line) layer on the semiconductor substrate and the photo collection region; and (d) a funneled light pipe on top of the photo collection region and in the BEOL layer, wherein the funneled light pipe comprises (i) a bottom cylindrical portion on top of the photo collection region of the photo collection region, (ii) a funneled portion which has a tapered shape and is on top and in direct physical contact with the bottom cylindrical portion, and (iii) a light reflective layer on side walls of the bottom cylindrical portion and the funneled portion.

The present invention provides a pixel sensor structure that does not have the micro-lens of the prior art.

DETAILED DESCRIPTION OF THE INVENTION

FIGS. 1A-1I show cross-section views of a pixel sensor 100 going through different fabrication steps of a fabrication process, in accordance with embodiments of the present invention.

Figure 1A:
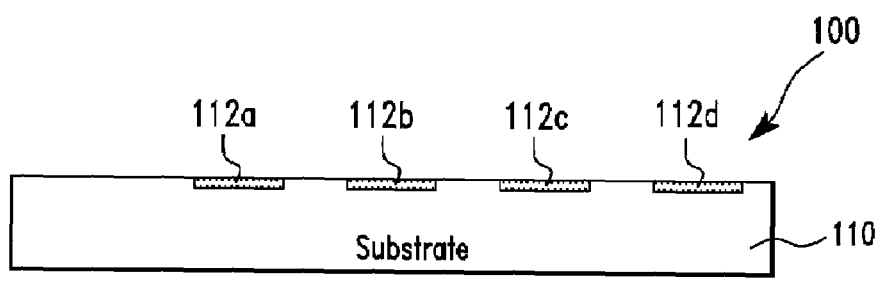
FIGS. 1A-1I show cross-section views of a pixel sensor going through different fabrication steps of a fabrication process, in accordance with embodiments of the present invention.

With reference to FIG. 1A, in one embodiment, the fabrication process starts out with a semiconductor substrate 110. Illustratively, the semiconductor substrate 110 comprises a semiconductor material such as silicon Si, germanium Ge, etc.

Next, in one embodiment, four photo collection region 112a, 112b, 112c, and 112d are formed on top of the semiconductor substrate 110 as shown in FIG. 1A. Illustratively, the four photo collection region 112a, 112b, 112c, and 112d are formed by using any conventional method. In one embodiment, the four photo collection region 112a, 112b, 112c, and 112d are photo diodes or photo gates 112a, 112b, 112c, and 112d, respectively.

Figure 1B:
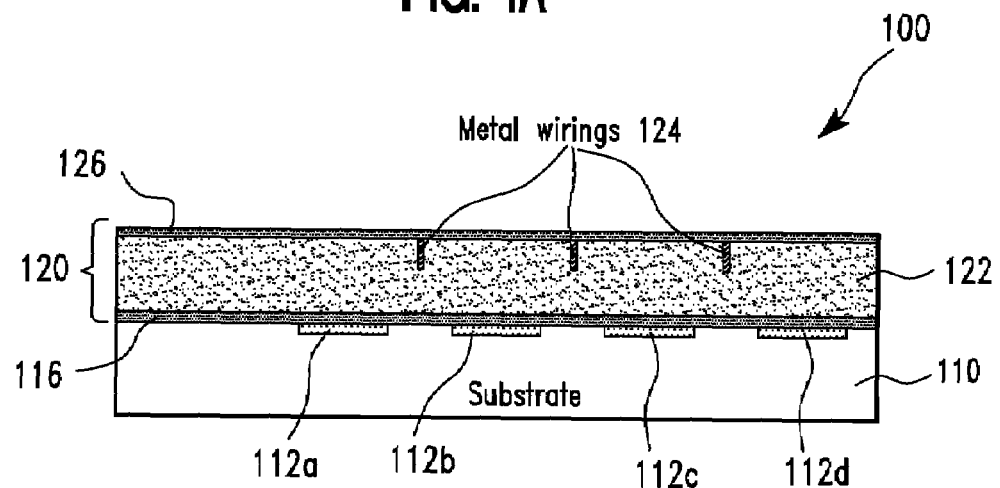

Next, with reference to FIG. 1B, in one embodiment, a nitride layer 116 is formed on top of the semiconductor substrate 110 and the photo diodes 112a, 112b, 112c, and 112d. More specifically, the nitride layer 116 can be formed by CVD (Chemical Vapor Deposition) of silicon nitride on top of the structure 100 of FIG. 1A.

Next, in one embodiment, a dielectric layer 122 is formed on top of the nitride layer 116. Illustratively, the dielectric layer 122 comprises an electrically insulating material such as USG (Undoped Silicate Glass).

Next, in one embodiment, metal lines 124 are formed in the dielectric layer 122. Illustratively, the metal lines 124 comprise copper, aluminum, or any other electrically conductive metal. In one embodiment, the metal lines 124 are formed by using a conventional method.

Next, in one embodiment, a nitride layer 126 is formed on top of the dielectric layer 122. Illustratively, the nitride layer 126 is formed by CVD of silicon nitride on top of the dielectric layer 122. The dielectric layer 122, the metal lines 124, and the nitride layer 126 are collectively referred to as an interconnect layer 120.

Figure 1C:
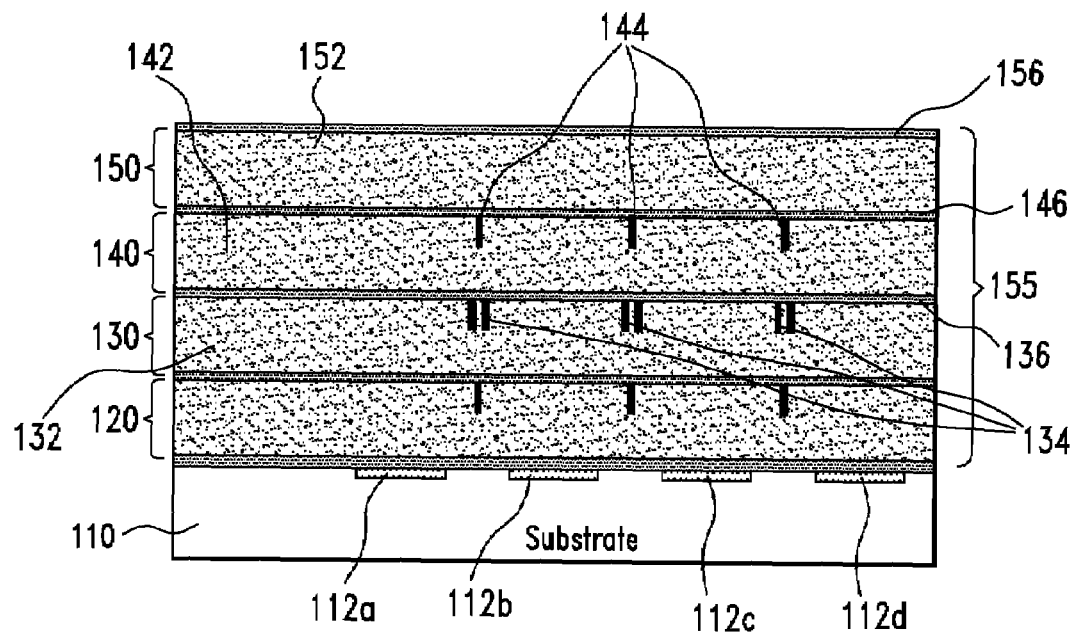

Next, with reference to FIG. 1C, in one embodiment, interconnect layers 130, 140, and 150 similar to the interconnect layer 120 are formed in that order on top of each other to provide interconnect multi-layers 155 as shown in FIG. 1C. The interconnect multi-layers 155 can also be referred to as a BEOL (Back End Of Line) layer 155. In one embodiment, the formation of each of the interconnect layers 130, 140, and 150 is similar to the formation of the interconnect layer 120. In one embodiment, the nitride layers 126, 136, and 146 separate the adjacent interconnect layers 120, 130, 140, and 150.

Figure 1D:
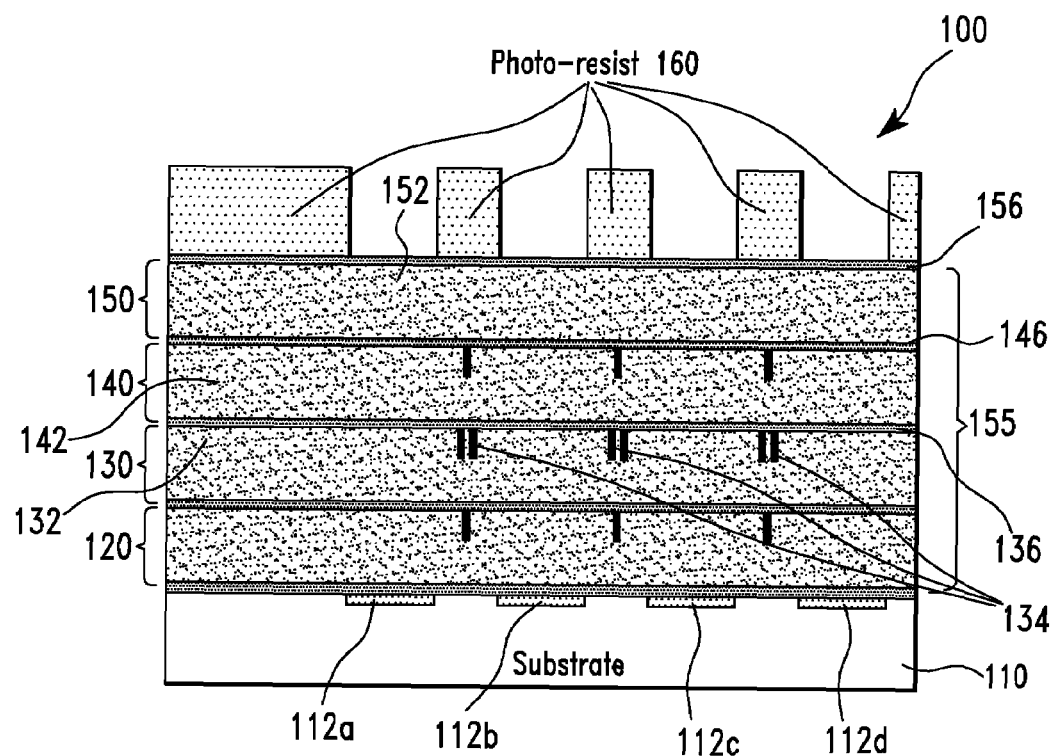

Next, with reference to FIG. 1D, in one embodiment, a patterned photo-resist layer 160 is formed on top of the nitride layer 156. In one embodiment, the patterned photo-resist layer 160 is formed by using a conventional lithographic process.

Figure 1E:
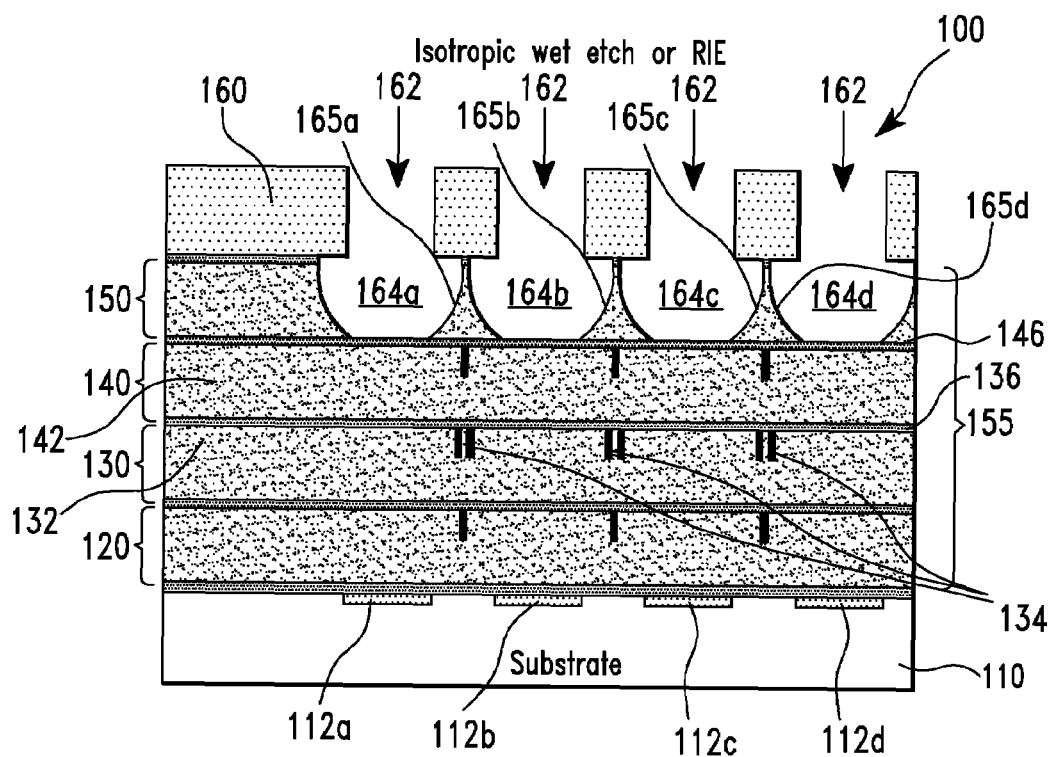

Next, with reference to FIG. 1E, in one embodiment, the patterned photo-resist layer 160 is used as a blocking mask to etch the interconnect multi-layers 155 stopping at the nitride layer 146 to form funnels 164a, 164b, 164c, and 164d in the interconnect multi-layers 155. This etching step is represented by arrows 162 and hereafter is referred to as the etching step 162. In one embodiment, the etching step 162 is performed isotropically such that the cross-section of each of side walls 165a, 165b, 165c, and 165d of the funnels 164a, 164b, 164c, and 164d, respectively, has a shape of a concave hyperbola as shown in FIG. 1E.

Figure 1F:
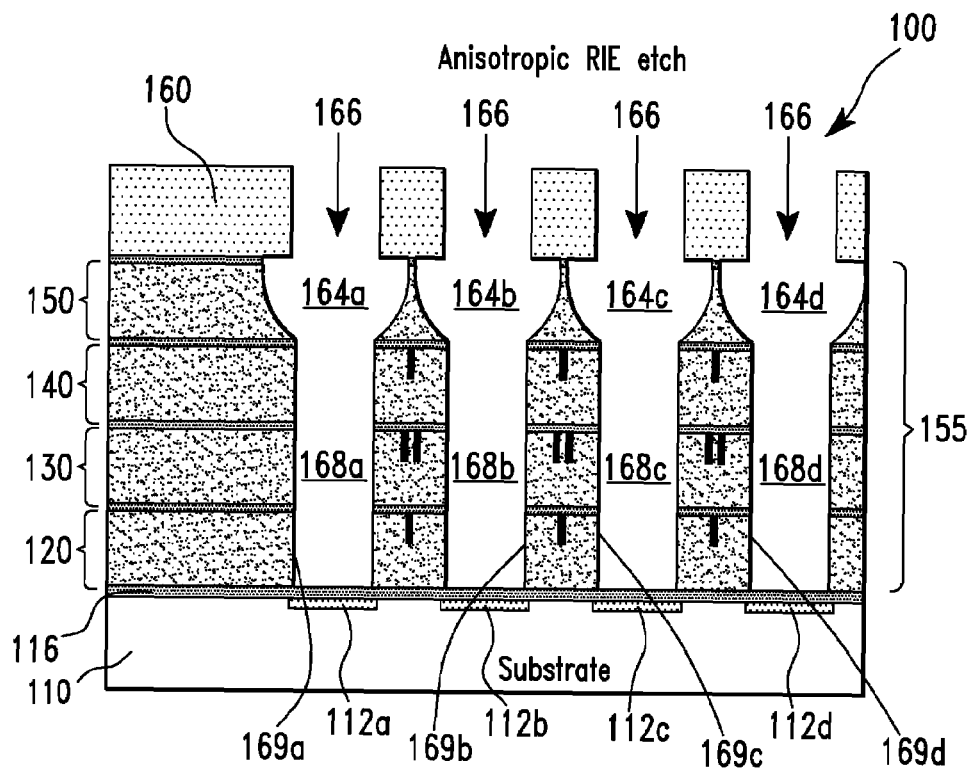

Next, with reference to FIG. 1F, in one embodiment, the patterned photo-resist layer 160 is used as a blocking mask to further etch through the interconnect multi-layers 155 stopping at the nitride layer 116 to form cavities 168a, 168b, 168c, and 168d. This etching step is represented by arrows 166 and hereafter is referred to as the etching step 166. In one embodiment, the etching step 166 is an anisotropic etching process. Because the etching step 166 is anisotropic, so side walls 169a, 169b, 169c, and 169d of the cavities 168a, 168b, 168c, and 168d, respectively, are vertical. The funnel 164a and the cavity 168a can be collectively referred to as a funneled pipe 164a, 168a. Similarly, the funnel 164b and the cavity 168b can be collectively referred to as a funneled pipe 164b, 168b. The funnel 164c and the cavity 168c can be collectively referred to as a funneled pipe 164c, 168c. The funnel 164d and the cavity 168d can be collectively referred to as a funneled pipe 164d, 168d.

Figure 1G:
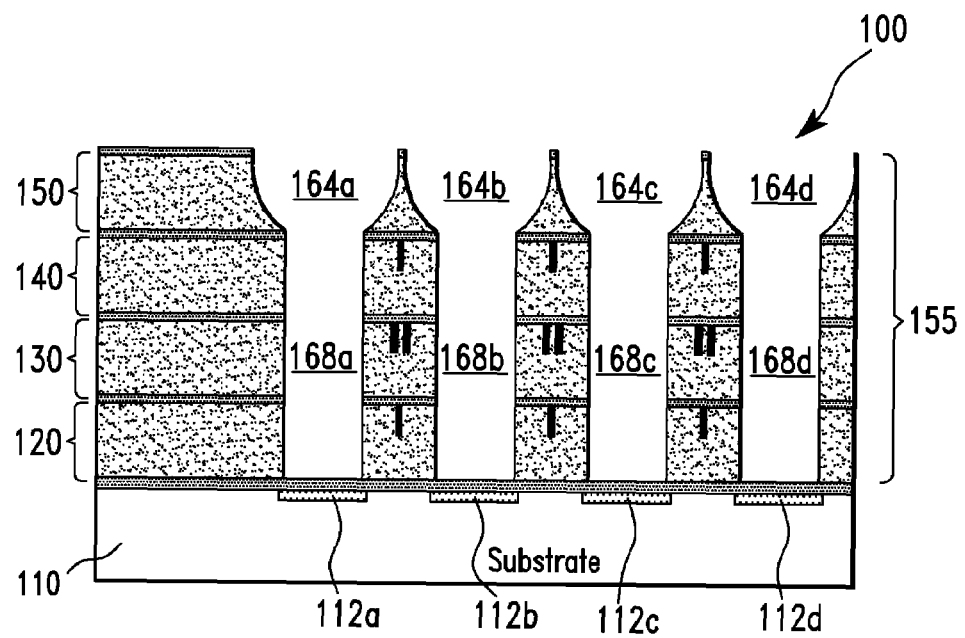

Next, in one embodiment, the patterned photo-resist layer 160 is removed by using a wet etching step, resulting in the structure 100 of FIG. 1G. Alternatively, the patterned photo-resist layer 160 is removed by using an oxygen based plasma etch.

Figure 1H:
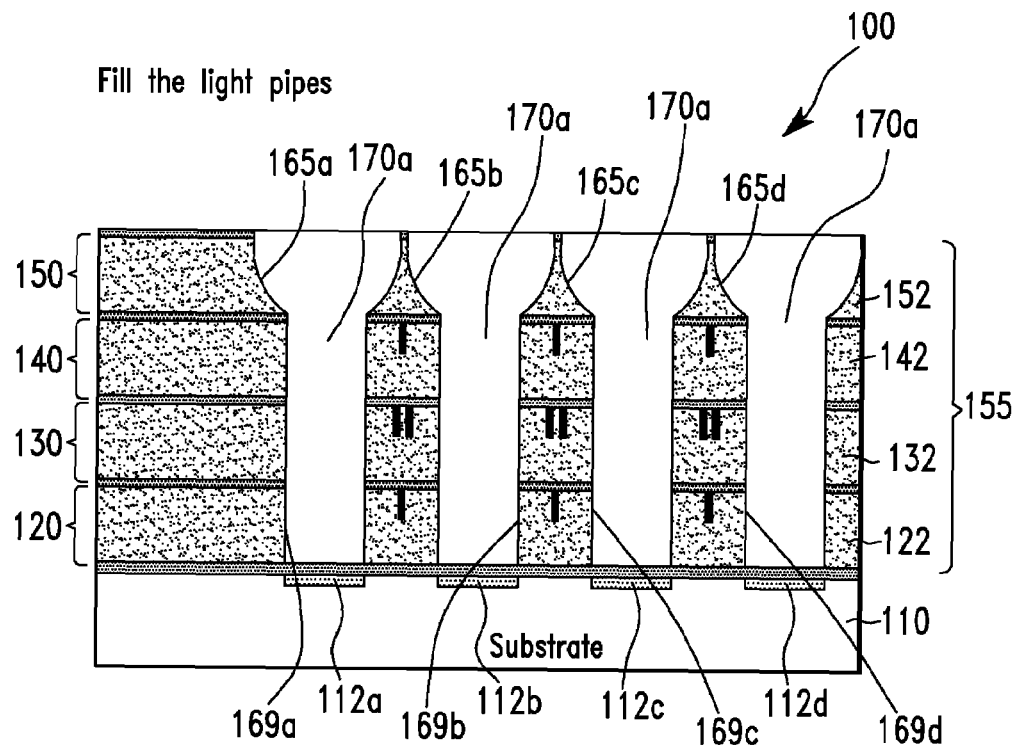

Next, with reference to FIG. 1H, in one embodiment, the funneled pipes 164a, 168a; 164b, 168b; 164c, 168c; and 164d, 168d (in FIG. 1G) are filled with a transparent material so as to form funneled light pipes 170a, 170b, 170c, and 170d, respectively. Illustratively, the funneled light pipes 170a, 170b, 170c, and 170d are formed by depositing the transparent material on top of the entire structure 100 of FIG. 1G (including in the funneled pipes 164a, 168a; 164b, 168b; 164c, 168c and 164d, 168d) and then polishing by a CMP (Chemical Mechanical Polishing) step to remove excessive transparent material outside the funneled pipes 164a, 168a; 164b, 168b; 164c, 168c and 164d, 168d. In an alternative embodiment, the funneled pipes 164a, 168a; 164b, 168b; 164c, 168c; and 164d, 168d (in FIG. 1G) are filled with a spin-on photo-resist, and then the excessive photo-resist outside the funneled pipes 164a, 168a; 164b, 168b; 164c, 168c and 164d, 168d can be removed by using a standard lithographic process. In one embodiment, the spin-on photo-resist is a clear material.

In one embodiment, the transparent material of the funneled light pipes 170a, 170b, 170c, and 170d has a refractive index: (a) which is higher than the refractive index of the material of the dielectric layers 122, 132, 142, and 152 surrounding the funneled light pipes 170a, 170b, 170c, and 170d, and (b) but which is lower than the refractive index of the material of the nitride layer 116 above the photo diodes 112a, 112b, 112c, and 112d. In one embodiment, the transparent material of the funneled light pipes 170a, 170b, 170c, and 170d can be BPSG (boro-phospho-silicate glass), or silicon nitride.

In an alternative embodiment, the side walls 165a, 165b, 165c, 165d, 169a, 169b, 169c, and 169d of the funneled pipes 164a, 168a; 164b, 168b; 164c, 168c and 164d, 168d are coated with a light reflective material (such as aluminum) so as to form a light reflective layer (not shown) before the funneled light pipes 170a, 170b, 170c, and 170d are formed as described above. More specifically, the aluminum layer is formed by depositing aluminum on top of the entire structure 100 of FIG. 1G (including on the side walls 165a, 165b, 165c, 165d, 169a, 169b, 169c, and 169d of the funneled pipes 164a, 168a; 164b, 168b; 164c, 168c and 164d, 168d) by CVD and then etching back to remove excessive aluminum outside the funneled pipes 164a, 168a; 164b, 168b; 164c, 168c and 164d, 168d. As a result, the aluminum layer remains on the side walls 165a, 165b, 165c, 165d, 169a, 169b, 169c, and 169d after the etching step. In this alternative embodiment, because of the aluminum layer on the side walls 165a, 165b, 165c, 165d, 169a, 169b, 169c, the refractive index of the transparent material does not need to be higher than the refractive index of the material of the dielectric layers 122, 132, 142, and 152.

In yet another alternative embodiment, the side walls 165a, 165b, 165c, 165d, 169a, 169b, 169c, and 169d of the funneled pipes 164a, 168a; 164b, 168b; 164c, 168c and 164d, 168d can be first coated with a nitride film (not shown) so as to form a "cladding" and then an oxide material or a clear polymer can be used to fill the funneled pipes 164a, 168a; 164b, 168b; 164c, 168c and 164d, 168d as described above.

Figure 1I:
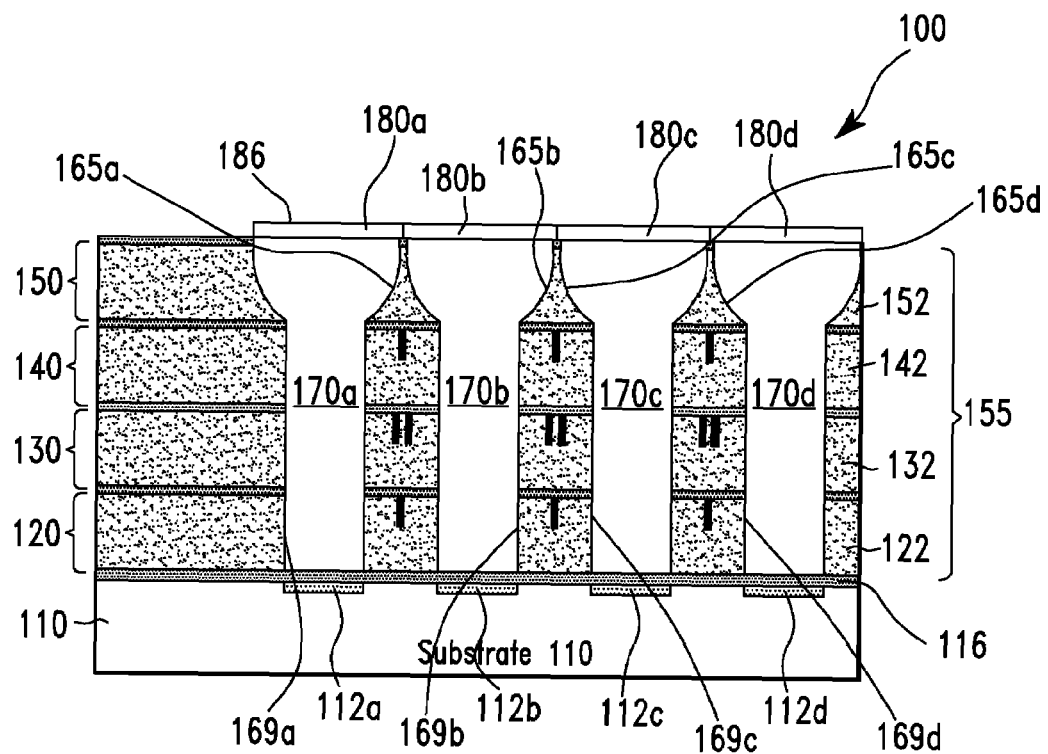
Figure 1I:
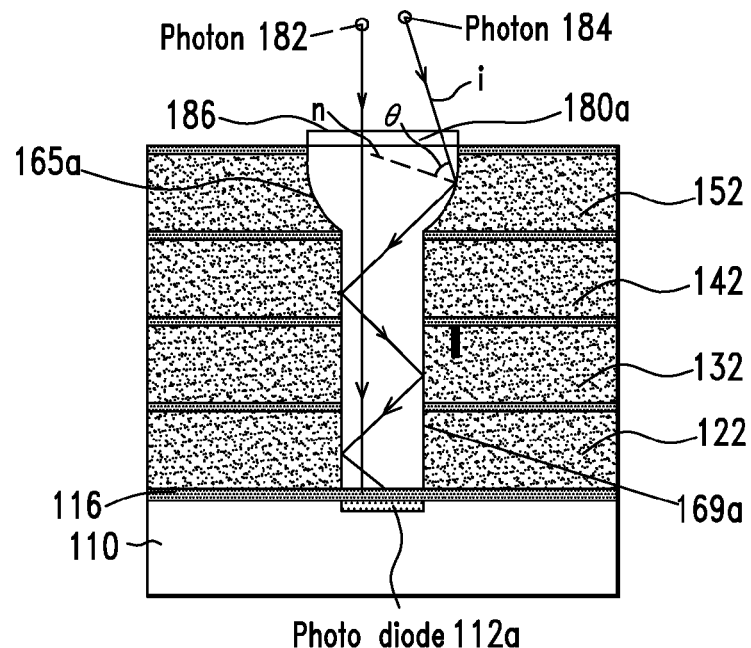

Next, with reference to FIG. 1I, in one embodiment, CFA (Color Filter Array) regions 180a, 180b, 180c, and 180d are formed on top of the funneled light pipes 170a, 170b, 170c, and 170d, respectively. More specifically, the CFA regions 180a and 180c comprise a green color filter material that allows only green photons to pass through it. The CFA region 180b comprises a blue color filter material that allows only blue photons to pass through it. The CFA region 180d comprises a red color filter material that allows only red photons to pass through it. In one embodiment, the CFA regions 180a, 180b, 180c, and 180d are formed as follows. First, the green CFA regions 180a and 180c are formed by using any conventional method. Then, in a similar manner, the blue CFA region 180b and the red CFA region 180d are formed in turn. The resulting structure 100 is shown in FIG. 1I. It should be noted that the green, red, blue colors are used for illustration only and other colors can be used. In one embodiment, the arrangement of the CFA regions 180a, 180b, 180c, and 180d can be different.

In one embodiment, the operation of the pixel sensor 100 of FIG. 1I is as follows. Assume that a light beam (not shown) which comprises blue, red, and green photons is incident on the surface 186 of the structure 100 of FIG. 1I. The CFA regions 180a, 180b, 180c, and 180d ensure that only green photons pass through the green CFA regions 180a and 180c, only blue photons pass through the blue CFA region 180b, and only red photons pass through the red CFA region 180d. FIG. 1I' shows paths of photons in the funneled light pipe 170a of FIG. 1I, for illustration. With reference to FIGS. 1I and 1I', some of the green photons that pass through the CFA region 180a (like photon 182) will travel down the funneled light pipe 170a to arrive at the photo diode 112a without hitting the side walls 165a and 169a of the funneled light pipe 170a. Some others of the green photons that pass through the CFA region 180a (like a photon 184) will hit the side walls 165a and 169a at possibly different incident angles. In the representative case of the photon 184, the photon 184 travels along a path i and hits the side wall 165a at an incident angle θ (θ is the angle between the path i and an imaginary line n, called a normal line, that is perpendicular to the side wall 165a at the incident point of the photon 184). If the incident angle θ of the photon 184 is less than a critical angle $\theta_0$ (not shown), the photon 184 will refract into the BEOL layer 155. The critical angle $\theta_0$ is determined by the mathematical formula:

$$\theta_0 = \sin^{-1}\left(\frac{n_{dielectric\ material}}{n_{transparent\ material}}\right)$$

wherein $n_{dielectric\ material}$ is refractive index of the material of the dielectric layers 122, 132, 142, and 152 and $n_{transparent\ material}$ is refractive index of the transparent material of the funneled light pipe 170a. If the incident angle θ of the photon 184 is greater than the critical angle $θ_0$, the photon 184 will bounce back (i.e., reflect) into the funneled light pipe 170a. Then, the photon 184 can travel down the funneled light pipe 170a and arrive at the photo diode 112a, or hit the side walls 165a and 169a one or more times at possibly different incident angles (not shown). If these incident angles are also greater than the critical angle $θ_0$, the photon 184 will travel down the funneled light pipe 170a and arrive at the photo diode 112a. The greater $n_{transparent\ material}$ is, the smaller the critical angle $θ_0$ is, and therefore, the more green photons (like the photon 184) that arrive at the photo diode 112a. Blue photons of the light beam that pass through the blue CFA region 180b will travel down along the funneled light pipe 170b and reach the photo diodes 112b in a similar manner. Red photons of the light beam that pass through the red CFA region 180d will travel down along the funneled light pipe 170d and reach the photo diodes 112d in a similar manner. As a result, the greater $n_{transparent\ material}$ is, the more photons of the light beam that arrive at the photo diodes 112a, 112b, 112c and 112d. It should be noted that the description above is for the case where there is no light reflective coating layer on side walls 165a, 165b, 165c, 165d, 169a, 169b, 169c, and 169d. If the side walls 165a, 165b, 169a, 169b, 169c, and 169d of the funneled pipes 164a, 168a; 164b, 168b; 164c, 168c and 164d, 168d are coated with the light reflective material (such as aluminum) and then filled with the transparent material as describe above with reference to FIG. 1H, the photon 184 will reflect back regardless of the incident angle θ.

Figure 2:
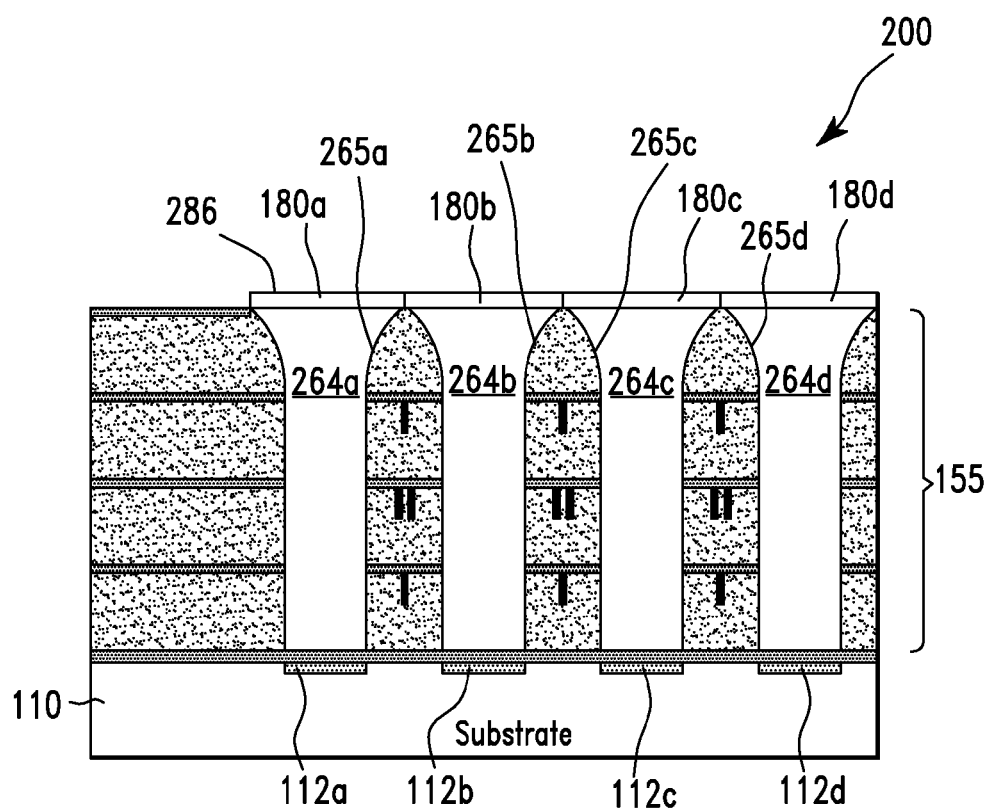
FIGS. 2, 3, and 4 show other embodiments of the pixel sensor of FIG. 1I, in accordance with embodiments of the present invention.

FIG. 2 shows a cross-section view of a pixel sensor 200, in accordance with embodiments of the present invention. In one embodiment, the pixel sensor 200 is similar to the pixel sensor 100 of FIG. 1I, except that the cross-section of each of side walls 265a, 265b, 265c, and 265d of the funnels 264a, 264b, 264c, and 264d has a shape of a convex hyperbola as shown in FIG. 2 (as opposed to the concave hyperbolic shape of the side walls 165a, 165b, 165c, and 165d of the funnels 164a, 164b, 164c, and 164d, respectively, as shown in FIG. 1I). For simplicity, similar regions and layers will have the same reference numeral. In one embodiment, the convex hyperbolic side walls 265a, 265b, 265c, and 265d of the funnels 264a, 264b, 264c, and 264d, respectively, are formed by etching with a changing component of chemical substance or another chemical substance. In one embodiment, the convex hyperbolic side walls 265a, 265b, 265c, and 265d of the funnels 264a, 264b, 264c, and 264d are formed by polymerizing RIE process (fluorocarbon chemistry with CHF3 or C4F8 for example), and then the lower portions of light pipes are formed by non-polymerizing RIE process (CF4 or CHF3/O2 or C4F8/O2).

In one embodiment, the operation of the pixel sensor 200 is similar to the operation of the pixel sensor 100 of FIG. 1I as described above. More specifically, when a light beam (not shown) is incident on the surface 286 of the structure 200, most of the photons of the light beam that pass through the CFA regions 180a, 180b, 180c, and 180d will arrive at the photo diodes 112a, 112b, 112c and 112d, respectively.

Figure 3:
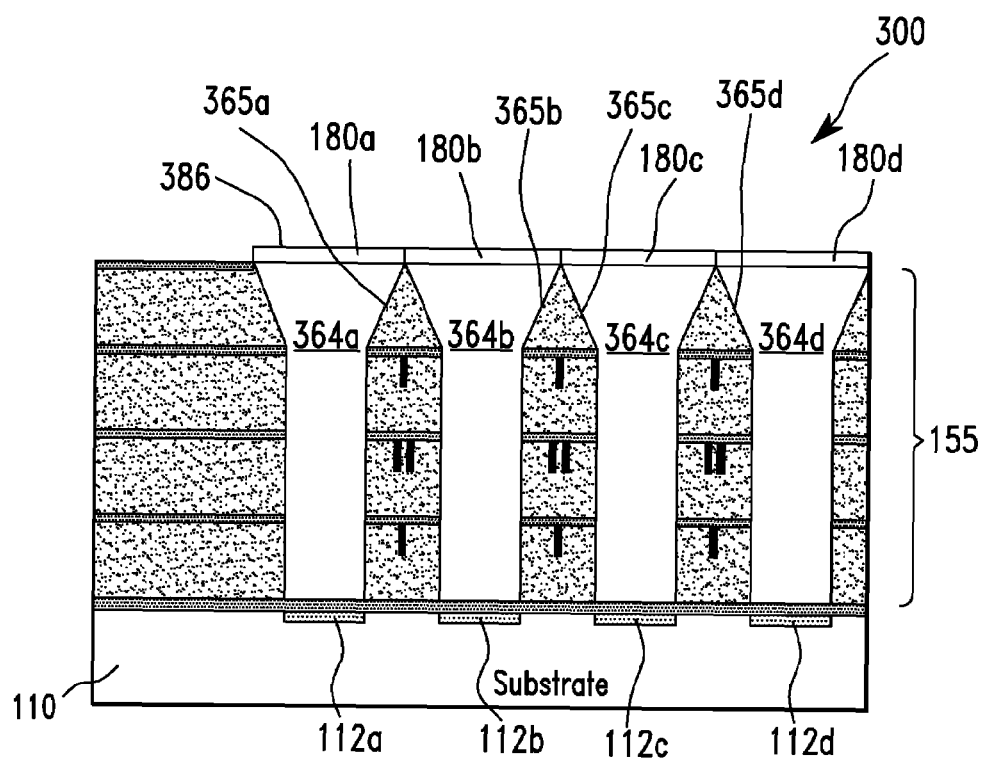

FIG. 3 shows a cross-section view of a pixel sensor 300, in accordance with embodiments of the present invention. In one embodiment, the pixel sensor 300 is similar to the pixel sensor 100 of FIG. 1I, except that the cross-section of each of side walls 365a, 365b, 365c, and 365d of the funnels 364a, 364b, 364c, and 364d is a slant straight line as shown in FIG. 3. In one embodiment, the straight side walls 365a, 365b, 365c, and 365d of the funnels 364a, 364b, 364c, and 364d, respectively, are formed by etching with a changing component of chemical substance or another chemical substance. In one embodiment, the straight funnels 364a, 364b, 364c, and 364d are formed by polymerizing RIE process (fluorocarbon chemistry with CHF3 or C4F8 for example), and then the lower portions of light pipes are formed by non-polymerizing RIE process (CF4 or CHF3/O2 or C4F8/O2). In one embodiment, the straight funnels 364a, 364b, 364c, and 364d can also be formed by anisotropic RIE to form non-tapered light pipe (including lower portions) and followed by sputter etch (in Ar for example) to form tapered upper portions of light pipes.

In one embodiment, the operation of the pixel sensor 300 is similar to the operation of the pixel sensor 100 of FIG. 1I as described above. More specifically, when a light beam (not shown) is incident on the surface 386 of the structure 300, most of the photons of the light beam that pass through the CFA regions 180a, 180b, 180c, and 180d will arrive at the photo diodes 112a, 112b, 112c, and 112d, respectively.

Figure 4:
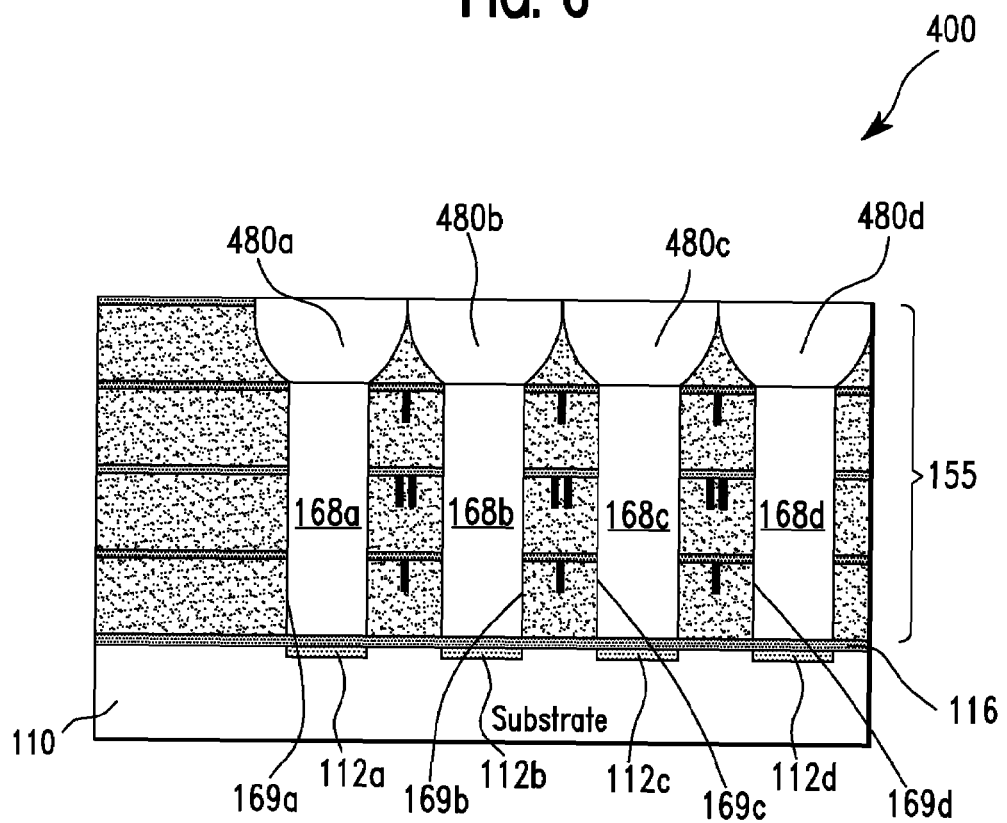
Figure 4:
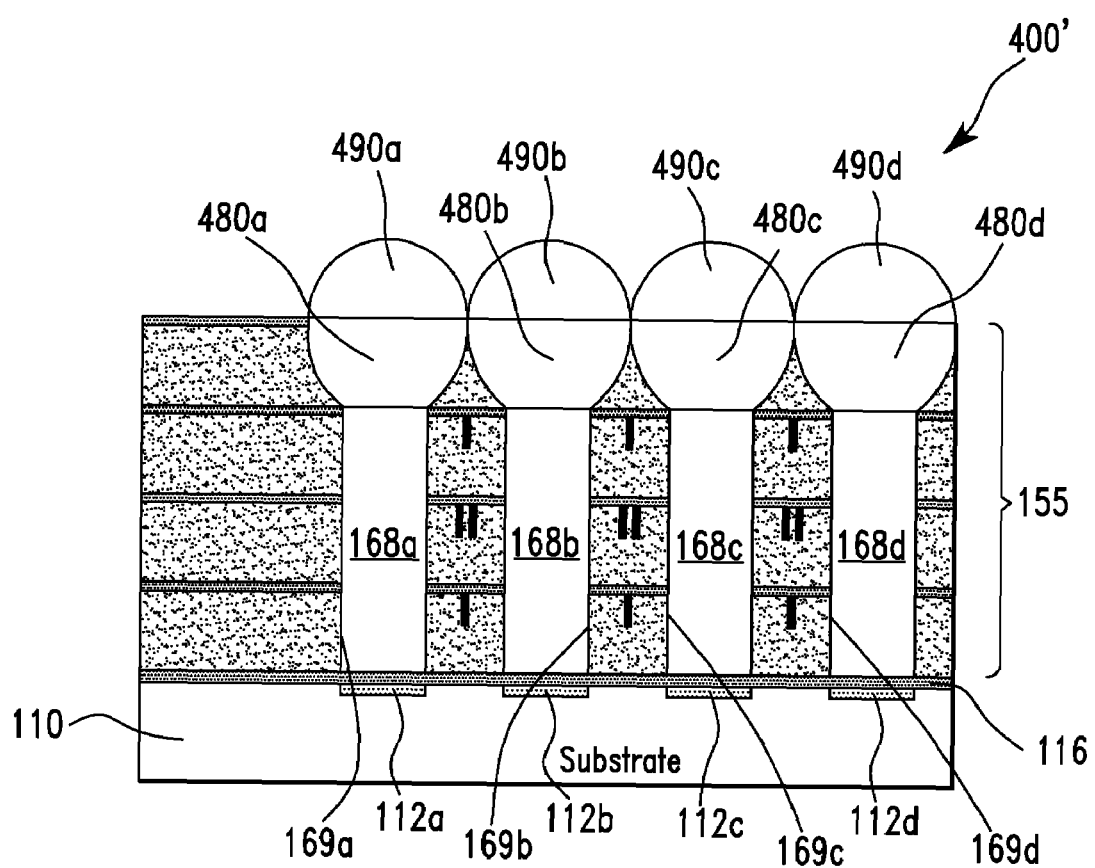

FIG. 4 shows a cross-section view of a pixel sensor 400, in accordance with embodiments of the present invention. In one embodiment, the formation of the pixel sensor 400 is similar to the formation of the structure 100 of FIG. 1H, except for the formation of funneled light pipes 168a, 480a; 168b, 480b; 168c, 480c; and 168d, 480d. More specifically, the cavities 168a, 168b, 168c, and 168d of the funneled light pipes 168a, 480a; 168b, 480b; 168c,480c; and 168d,480d are filled with the transparent material which is then etched back down to the filled cavities 168a, 168b, 168c, and 168d. Next, in one embodiment, CFA funneled regions 480a, 480b, 480c, and 480d are formed in the funnels 164a, 164b, 164c, and 164d, respectively, by using any conventional method, resulting in the structure 400 of FIG. 4. More specifically, the funnels 164a and 164c are filled with a green color filter material to form the green CFA funneled regions 480a and 480c that allow only green photons to pass through them. Then, the funnel 164b is filled with a blue color filter material to form the blue CFA funneled region 480b that allows only blue photons to pass through it. Then, the funnel 164d is filled with a red color filter material to form the red CFA funneled region 480d that allows only red photons to pass through it.

In one embodiment, the operation of the pixel sensor 400 of FIG. 4 is similar to the operation of the pixel sensor 100 of FIG. 1I. It should be noted that the CFA funneled regions 480a, 480b, 480c, and 480d play two roles: (a) the role of color filter regions (similar to the role of the CFA regions 180a, 180b, 180c, and 180d of FIG. 1I) and (b) the role of funneled regions (similar to the role of the filled funnels 164a, 164b, 164c, and 164d of FIG. 1I).

FIG. 4' shows a cross-section view of a pixel sensor 400', in accordance with embodiments of the present invention. In one embodiment, the formation of the pixel sensor 400' is similar to the formation of the pixel sensor 400 of FIG. 4, except that micro-lenses 490a, 490b, 490c, and 490d are formed on top of the CFA funneled regions 480a, 480b, 480c, and 480d, respectively. The micro-lenses 490a, 490b, 490c, and 490d are used to focus light into the CFA funneled regions 480a, 480b, 480c, and 480d, respectively. It should be noted that the micro-lenses 490a, 490b, 490c, and 490d can be applied to all the embodiments, including with and without color filter arrays (like the CFA regions 180a, 180b, 180c, and 180d of FIG. 1I).

In the embodiments described above, with reference to FIGS. 1A-1I, there are four photo diodes 112a, 112b, 112c, and 112d. In general, the pixel sensor 100 can have N photo diodes, and wherein N is a positive integer.

In the embodiments described above, with reference to FIG. 1E, the etching step 162 stops at the nitride layer 146 of the interconnect layer 140. In an alternative embodiment, the etching step 162 stops before the nitride layer 146 is exposed to surrounding ambient. In yet another alternative embodiment, the etching step 162 etches through the nitride layer 146 and stops at the nitride layer 136. In general, the etching step 162 can stop at anywhere in the interconnect multi-layers 155.

In the embodiments described above, the side walls of the funnels 164a, 164b, 164c, and 164d (FIG. 1G), the funnels 264a, 264b, 264c, and 264d (FIG. 2), and the funnels 364a, 364b, 364c, and 364d (FIG. 3) have a hyperbolic shape. Alternatively, they have a parabolic shape.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A semiconductor structure fabrication method, comprising:
   providing a structure that includes (i) a semiconductor substrate, (ii) a photo collection region on the semiconductor substrate, and (iii) a BEOL (Back End Of Line) layer on the photo collection region and the semiconductor substrate;
   etching the BEOL layer so as to form a funneled cavity in the BEOL layer, wherein a cross-section of the funneled cavity has a tapered shape;
   after said etching the BEOL layer so as to form the funneled cavity in the BEOL layer is performed, further etching the BEOL layer through the funneled cavity so as to form a cylindrical cavity in the BEOL layer, wherein the cylindrical cavity are directly above the photo collection region and directly beneath the funneled cavity;
   forming a funneled light pipe in the cylindrical cavity and the funneled cavity;
   after said forming the funneled light pipe is performed, removing a top portion of the funneled light pipe from the funneled cavity;
   after said removing the top portion is performed, forming a color filter region in the funneled cavity; and
   forming a micro-lens on top of the color filter region,
      wherein the color filter region comprises a transparent material whose refractive index is higher than a refractive index of a material of the BEOL layer,
      wherein the BEOL layer comprises M interconnect layers, M being a positive integer, and
      wherein the entire color filter region resides in a top interconnect layer of the M interconnect layers.

2. The method of claim 1, further comprising, after said etching the BEOL layer through the funneled cavity is performed and before said forming the funneled light pipe in the cylindrical cavity and the funneled cavity is performed, forming a light reflective layer on side walls of the cylindrical cavity and the funneled cavity.

3. The method of claim 1, wherein the light reflective layer comprises aluminum.

* * * * *